Aug. 22, 1944.    E. A. RODMAN    2,356,354
METHOD OF COATING FABRIC
Filed Oct. 26, 1940

Ernest A Rodman
INVENTOR

BY Frank C. Hilberg
ATTORNEY

Patented Aug. 22, 1944

2,356,354

UNITED STATES PATENT OFFICE 2,356,354

METHOD OF COATING FABRIC

Ernest A. Rodman, Newburgh, N. Y., assignor to E. I. du Pont de Nemours & Company, Wilmington, Del., a corporation of Delaware Application October 26, 1940, Serial No. 362,958

1 Claim. (Cl. 117—68.5)

This invention relates to a method of coating fabrics with a thin waterproof or water repellent coating on at least one side and more particularly to the preparation of surgical adhesive tape having a pressure sensitive rubber adhesive mass on the side of the fabric sheet opposite the thin waterproof film.

This application is a continuation-in-part of my copending application Serial No. 253,886, filed January 31, 1939, now U. S. Patent 2,231,818 which issued February 11, 1941.

Heretofore it has been customary to make adhesive tape by applying an adhesive rubber mass directly onto a thin sheeting; however, such a material has the disadvantage of becoming soiled very readily and must be replaced frequently by clean surgical tape, which usually has a deleterious effect on the wound. More recently it has been proposed to render the fabric waterproof by applying a film of a cellulose derivative on the side of the fabric opposite the rubber mass. This material presents marked advantages over the non-treated fabric but its cost is relatively high and when cellulose nitrate is used there is the disadvantage that it cannot be sterilized at high temperatures. Another disadvantage is that such compositions are usually applied from solution, which is relatively expensive in that the volatile solvent is lost or if recovered, involves the use of expensive solvent recovery apparatus.

It is therefore an object of this invention to prepare a cleanable surgical adhesive tape at a relatively low cost which may, if necessary, be sterilized at relatively high temperatures. Another object of the present invention is a method of preparing adhesive tape in which a composition containing cellulose derivative is applied in the absence of volatile solvents directly to a fabric base. A still further object is the provision of a method whereby thin films of cellulose derivative materials may be calendered on a fabric base. Other objects will be apparent as the description of the invention proceeds.

These objects are accomplished by preparing a composition containing a cellulose derivative, a lubricant and a plasticizing agent, applying the composition, in the absence of volatile solvents, directly to a fabric base so that a thin film of about 1 to 4 ounces of the said composition is deposited per square yard of fabric and when adhesive tape is the object, subsequently applying a pressure sensitive rubber adhesive mass on the side of the fabric opposite the above mentioned composition.

Figure 1:
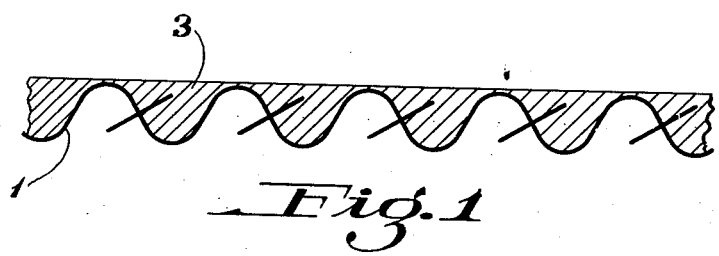
Figure 2:
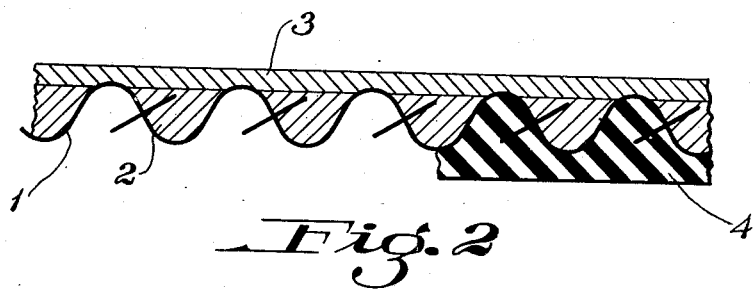

In the drawing Fig. 1 represents a diagrammatic section through a fabric having a single calendered layer on the surface, as hereinafter described. Fig. 2 represents a similar diagrammatic section in which an anchor coat has been applied and subsequently a thin film calendered on the surface thereof. This figure also shows a pressure sensitive rubber composition on the opposite side partly broken away. It is to be understood that this adhesive can also be applied to the material shown in Fig. 1. In both of the figures, 1 represents the fabric base, 2 is the anchor coat and 3 is a film applied by means of a calender. The pressure sensitive rubber adhesive is shown as 4. The drawing is merely diagrammatic and is not drawn to scale.

The invention will be more fully understood from a description of specific example, although it is to be understood that these examples are given merely to illustrate the invention since it is not to be limited thereto.

Example 1

A cellulose acetate composition suitable for preparing a surgical adhesive tape according to the present invention is as follows:

| | Parts by weight |
|---|---|
| Cellulose acetate | 1.00 |
| Tributyl phosphate | .15 |
| Diethyl phthalate | .35 |
| Dimethoxy ethyl phthalate | 1.00 |
| Barium base titanium pigment | 3.00 |
| Oleic acid | .01 |

These ingredients, other than the pigment and oleic acid, were placed in a mixing machine such as a Werner & Pfleiderer or Banbury mixer and kneaded until a homogeneous colloid was obtained. In colloiding the composition it is preferred to maintain the temperature of the composition at about 70 to 90° C. To this colloid, comprising the cellulose acetate and plasticizers, was added the pigment. After the pigment was satisfactorily dispersed the oleic acid was added and the mixing continued until the entire mass was thoroughly mixed. If desired the pigment and oleic acid may be added after the cellulose acetate colloid has been transferred to mixing rolls which are preferably warmed to about 70 to 80° C. to facilitate the mixing. The mass was maintained at this temperature until ready for calendering onto the fabric. It was then transferred to calender rolls, heated to 100–115° C. and applied directly to a suitable fabric sheeting to the extent of 1 to 4 ounces per square yard of fabric. A suitable fabric for this purpose is a plain weave cotton fabric weighing approximately 3.78 ounces per lineal yard 40" wide and having a thread count of warp 80, filler 80, which was bleached by any conventional method well known in the art of bleaching fabrics. After the calender-coated fabric left the calender it was embossed in a desirable pattern. The material at this stage is ready to be rolled up and stored or coated directly with the pressure sensitive rubber mass. A suitable composition for this purpose is as follows:

| | Per cent by weight |
|---|---|
| Crude rubber | 8.1 |
| Rosin | 7.7 |
| Zinc oxide | 12.1 |
| Wool fat | 12.1 |
| Benzene | 60.0 |

Following the application of the pressure sensitive rubber adhesive mass on the side of fabric opposite the thin waterproof coating the material was cut into strips and wound on spools ready for use. The material was waterproof. Should it become soiled while in use it may be cleaned readily with ordinary soap and water.

A wide variety of pressure sensitive adhesives may be employed in the present invention. The one given herein is merely illustrative, many such compositions being known to the workers in the art. For further details reference is made to "The Chemical Formulary," vol. 2—Bennett, and "The Pharmacopeia of the United States" eleven decennial revision (1936). Such compositions usually consist of rubber, rosin or resins, wax or oil, and a filler or absorbent powder (for example, zinc oxide, orris root, and starch).

For convenience in spreading, the adhesive mass should be free from nodules. Especially desirable results have been obtained with compositions containing approximately 20% of pure rubber based on the non-volatile components of the composition. Zinc oxide, if used, preferably constitutes 20% to 30% of the composition on the same basis. The volatile solvent of the spreading mass may vary widely, although 40% to 50% is usually used.

The amount of pressure sensitive adhesive applied usually runs between 5.5 and 7.0 ounces per square yard. The intermediate range of 6.2 to 6.7 has been found to be the most desirable for ordinary surgical tape.

Another preferred pressure sensitive adhesive mass consists of:

| | Per cent by weight |
|---|---|
| Crude rubber | 10 |
| Zinc oxide | 5 |
| Mineral oil | 35 |
| Benzene | 50 | combined by mixing the rubber with the benzene until thoroughly dissolved, and thereafter mixing with a cream or paste formed by thoroughly mixing the zinc oxide with the mineral oil. After the rubber mass has been applied the tape may be cut up into narrow widths and made up into small spools ready for use.

It is sometimes desirable to sterilize the adhesive tape in which case, following the application of the pressure sensitive rubber adhesive mass, the material is cut into narrow strips and short lengths approximately ¾ inch wide and approximately 3 inches long. A small piece of gauze approximately ¾ inch wide and 1 inch long is then adhered to the rubber adhesive in the center of the cut strip and two pieces of crinoline fabric are then applied over the uncovered pressure sensitive rubber adhesive mass. The material is then placed in a suitable paper container and sealed. The sealed container must withstand sterilizing conditions and allow steam to penetrate the container in order that the enclosed adhesive tape will be sterilized. An example of a suitable container is a glassine type of paper. The sealed package containing the adhesive tape is then subjected to an atmosphere of steam for 30 minutes at a temperature of 115° C. The material is then suitably packed and stored.

The following examples illustrate other compositions which may be used to cover the fabric to render it waterproof or water repellent and easily cleanable. It is to be understood that the process of making the coating composition as well as the finished product given in Example 1 likewise applies to the other examples. The rubber mass does not in itself form a part of this invention but may be varied as suggested above.

During the colloiding of the cellulose derivatives temperatures different from 70 to 90° C. mentioned above may be more desirable in certain specific cases as described in the following examples, depending upon the particular cellulose derivative and plasticizing ingredients used.

*Example 2*

To a suitable fabric such as is used in Example 1 was applied the following anchor composition:

| | Parts by weight |
|---|---|
| Cellulose acetate | 1.00 |
| Ethyl phthalyl ethyl glycollate | 2.00 |
| Para toluene sulfonamide-formaldehyde condensation product | 1.25 |
| Acetone | 3.00 |

The anchor composition may also be prepared from the cellulose acetate composition disclosed in Example 1 or may be any of the following compositions to which is added sufficient volatile solvent to produce a composition having sufficient fluidity to be coated on the fabric base. This is put on by any conventional method such as a doctor knife or doctor roller. After the material has been coated with the anchor composition and passed through a drying chamber to expel the volatile solvents it is passed through the calender rolls and a thin film of the following material is calendered on as in Example 1:

| | Parts by weight |
|---|---|
| Cellulose acetate | 1 |
| Pthalic diester of monomethyl ether of ethylene glycol | 2 |
| White pigment | 6 |
| Cocoanut oil | .918 |

*Example 3*

| | Parts by weight |
|---|---|
| Cellulose acetate | 1 |
| Methyl phthalyl ethyl glycollate | 1.5 |
| White pigment | 4 |
| White mineral oil | .013 |

*Example 4*

| | Parts by weight |
|---|---|
| Cellulose acetate | 1 |
| Phthalic diester of monomethyl ether of ethylene glycol | 1.75 |
| White pigment | 2 |
| Stearic acid | .10 |

*Example 5*

| | Parts by weight |
|---|---|
| Ethyl cellulose | 1.0 |
| Pigment | 7.4 |
| Synthetic resin[1] | 1.6 |
| Dibutyl ammonium oleate | .02 |

[1] The synthetic resin in the above example consisted of a castor oil modified polyhydric alcohol straight chain dibasic acid resinous product, the dispersing medium being toluol. A small amount of toluol was added in the mixing operation to facilitate the colloiding process, which was driven off during the kneading of the mass.

*Example 6*

| | Parts by weight |
|---|---|
| Benzyl cellulose | 1.66 |
| Pigment or filler | 5.00 |
| Diethylene glycol diisobutyrate | 3.34 |
| White mineral oil | .10 |

*Example 7*

| | Parts by weight |
|---|---|
| Cellulose acetobutyrate | 1.00 |
| Dibutyl Cellosolve phthalate | 1.00 |
| Pigment | 4.00 |
| Ethyl stearate | .02 |

*Example 8*

| | Parts by weight |
|---|---|
| Cellulose acetopropionate | 1.0 |
| Ethyl phthalyl ethyl glycollate | 1.0 |
| Pigment | 3.0 |
| Methyl stearate | .01 |

A cellulose acetate having a combined acetic acid content of 52% to 58% is preferred in the above examples since it is more readily colloided than cellulose acetate having a different combined acetic acid content. However, other types are not to be excluded from the present invention.

It will be noted that in each of the above examples there is a small percentage of an organic compound such as oleic acid, stearic acid, cocoanut oil, white mineral oil, dibutyl ammonium oleate, ethyl stearate and methyl stearate. Other lubricants than those discussed in the examples may be used such as methyl and ethyl palmitate or methyl and ethyl oleate. The corresponding fatty acid soaps of the alkali metals as well as ammonium soaps may be used. Substituted ammonium soaps in which one or more hydrogens of the ammonium radical are replaced by an alkyl or hydroxy alkyl group may likewise be used. It will be observed that most of these compositions are of the polar type, and also that they melt at calendering temperatures. The proper selection of the lubricant will depend upon the cellulose derivative used, but in general it is preferred to use one which is substantially incompatible with the cellulose derivative. For lack of a better term I call these materials "lubricants." It is to be understood, however, that their function is not necessarily that of a lubricant as understood in the conventional sense.

With the prior art methods I have found that it is impossible to apply a satisfactory thin and uniform film of a dry cellulose derivative composition less than about 4 ounces per square yard to a fabric base by means of calender rolls, since such a thin film does not have sufficient tensile strength to be pulled away from the calender roll onto the fabric base. According to the present invention this difficulty is overcome by the addition of a small amount; that is, from .1% to about 1.0% of a so-called lubricant. While I prefer to operate within this range, it is possible in some instances to incorporate as much as 5% of a lubricant provided this amount does not deleteriously affect the rubber mass as well as the film former applied to the reverse side of the sheet. In any event, the amount of lubricant applied must be insufficient in amount to produce an adverse effect on the rubber adhesive within the normal life of the adhesive tape. It is likewise to be understood that the lubricant should not adversely affect the cellulose derivative.

Under some conditions cellulose nitrate may be used as the film forming ingredient and in such case any solvent plasticizer may be used provided it is not present in amount sufficient to affect the rubber adhesive mass adversely.

In addition to the plasticizers mentioned in the examples, others which may be used are as follows: methyl phthalyl ethyl glycollate, butyl phthalyl butyl glycollate, N-ethyl paratoluene sulfonamide, ethyl phthalate, methyl phthalate, butyl phthalate, and the phthalic diester of monobutyl ether of ethylene glycol.

In applying the film to the fabric I prefer to apply the thinnest amount possible and obtain a continuous film, which is in the order of 1.0 ounce to 4.0 ounces of film per square yard. So far as I am aware, no such thin film of cellulose derivatives has ever been applied heretofore by means of a calender. Heretofore the minimum which has ever been applied, so far as I am aware, is in excess of about 6 or 8 ounces per square yard of dry film. In the claims the term "thin film" is intended to refer to a film weighing 1.0 ounce to 4.0 ounces per square yard. Also in the claims the term "cellulose derivative" is used to refer to film forming cellulose derivatives such as cellulose esters, cellulose ethers, and mixed cellulose esters, and not to non-film forming cellulose derivatives such as glucose and carbon dioxide.

In some of the examples it will be noted that a relatively high percentage of pigment is called for. If desired, pigment may be eliminated entirely, although it is preferred to use a relatively high percentage. In place of the white pigment indicated in the formulae it is possible to use any other colors which have no deleterious effect on the rubber mass. Copper and manganese are among those which are to be avoided due to their deleterious effect on the rubber mass.

While we have discussed a base fabric of a particular weave, it is to be understood that under some conditions other fabrics may be used and a wide variation, including unwoven fabrics, is permissible within the scope of this invention.

While the invention has been described with reference to the production of a waterproof adhesive tape material having a thin coating, the invention will also be useful in the production of coated fabrics in general where it is desired to calender a thin film of a cellulose derivative or other film forming material onto a flexible base material.

It is apparent that many widely different embodiments of this invention may be made without departing from the spirit and scope thereof; and, therefore, it is not intended to be limited except as indicated in the appended claim.

I claim:

A method of preparing waterproof adhesive tape which comprises mixing 1 part of cellulose acetate with 1½ parts of plasticizer and subjecting the mass to a kneading action until homogeneous, adding thereafter 3 parts of pigment and continuing the mixing at a temperature of about 70° C. and thereafter adding about 2% of oleic acid, transferring the mixture to calender rolls, heating to a temperature of about 100° C., and thereafter calendering the said mass on a thin sheeting in amount of about 1½ ounces per square yard and thereafter applying a rubber pressure sensitive adhesive mass to the opposite side of the said sheet.

ERNEST A. RODMAN.